United States Patent [19]
Galabinski

[11] Patent Number: 5,971,370
[45] Date of Patent: Oct. 26, 1999

[54] INTEGRATED WATER DISTRIBUTION/ COOLING PAD SYSTEM

[75] Inventor: Martin J. Galabinski, Fort Meyers, Fla.

[73] Assignee: Munters Corporation, Fort Myers, Fla.

[21] Appl. No.: 09/007,505

[22] Filed: Jan. 15, 1998

[51] Int. Cl.⁶ ...................................................... B01F 3/04
[52] U.S. Cl. .................... 261/97; 261/106; 261/DIG. 41
[58] Field of Search ........................... 261/36.1, 99, 100, 261/103, 104, 106, 107, 97, DIG. 41

[56] References Cited

U.S. PATENT DOCUMENTS

| | | | |
|---|---|---|---|
| 2,522,600 | 9/1950 | Brookins | 261/106 |
| 2,535,386 | 12/1950 | Brookins | 261/106 |
| 3,322,405 | 5/1967 | Knudson et al. | 261/106 |
| 4,031,180 | 6/1977 | Bohanon | 261/106 |
| 4,045,523 | 8/1977 | Goettl | 261/106 |
| 4,080,410 | 3/1978 | Goettl | 261/106 |
| 4,200,599 | 4/1980 | Goettl | 261/106 |
| 4,389,352 | 6/1983 | Bohanon, Sr. | 261/106 |
| 4,846,266 | 7/1989 | Acker et al. | 261/103 |
| 4,933,117 | 6/1990 | Wilson | 261/106 |
| 5,130,063 | 7/1992 | Collins et al. | 261/106 |
| 5,606,868 | 3/1997 | Calvert | 261/106 |

*Primary Examiner*—C. Scott Bushey
*Attorney, Agent, or Firm*—Fitzpatrick, Cella, Harper & Scinto

[57] ABSTRACT

A water distribution system for use with an evaporative cooling pad having a top and first and second sides includes a water distribution pipe which has at least one water discharge outlet in its periphery. The pipe is mounted above the top of the pad and a water distribution unit extends along the top of the pad intermediate its first and second sides. The water discharge opening in the pipe is located to direct water against a deflector plate integrally formed in the deflector unit and having a predetermined configuration to direct water from the pipe onto the top of the pad. In addition, the pipe is mounted to rotate relative to the deflector plate in order to selectively expose the openings in a position facing away from the plate for cleaning.

54 Claims, 11 Drawing Sheets

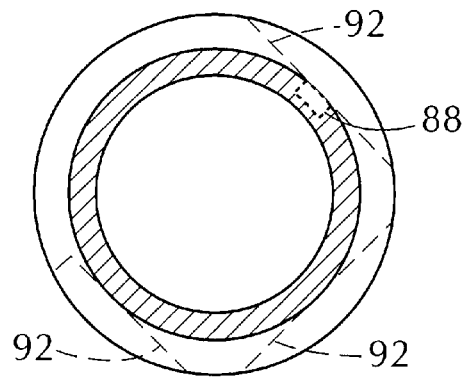
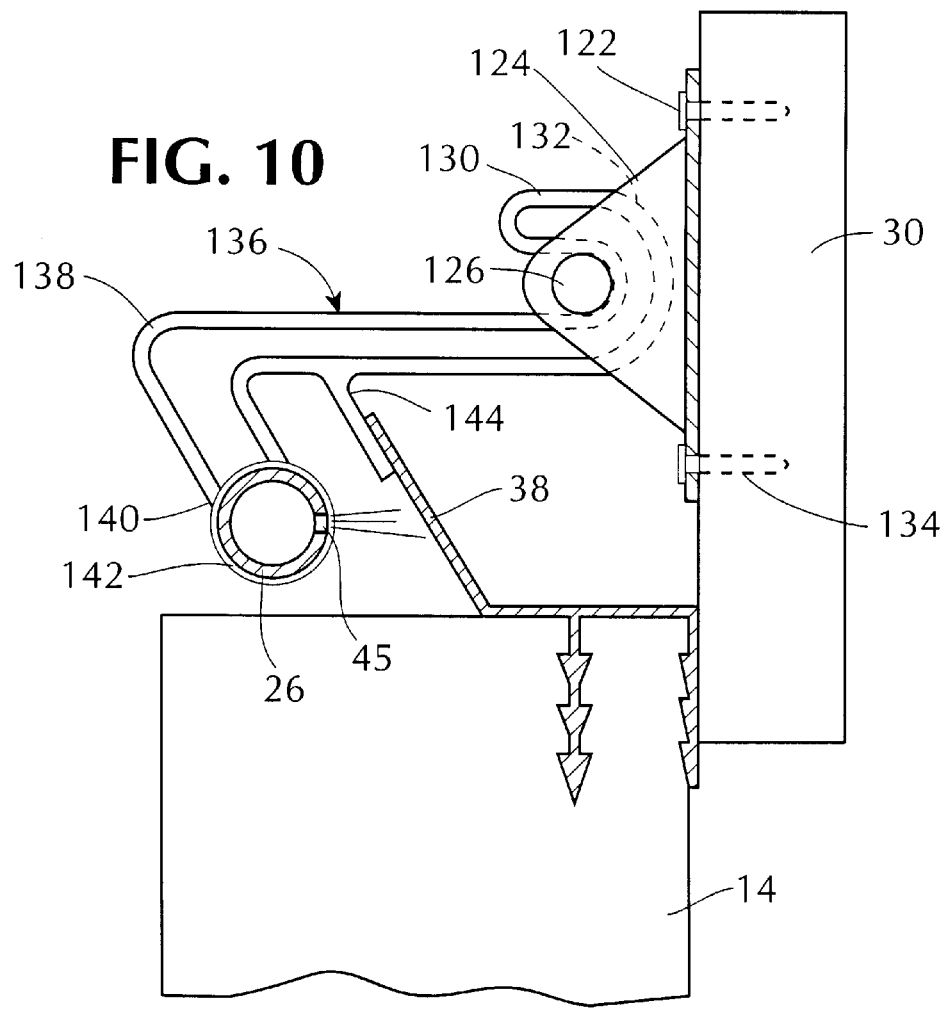

INTEGRATED WATER DISTRIBUTION/COOLING PAD SYSTEM

BACKGROUND OF THE INVENTION

Field of the Invention

The present invention relates to water distribution systems, and more particularly to water distributions systems for use with evaporative cooling pads.

Evaporative cooling is a well known technique in which water is passed in a cross or counter current relationship to air over an evaporative cooling medium. Such cooling mediums include, for example, cross corrugated evaporative cooling media formed of a variety of materials and sold by the Munters Corporation of Fort Myers, Fla.

The most common water distribution system used in evaporative cooling systems is a pipe with spray nozzles directing water upwardly into a cover of a general dome or semi-cylindrical shape. The cover or dome deflects the water downwardly into top of the cooling pad. One problem which arises with such evaporative cooling systems is that the spray holes or nozzles in the water distribution pipe are not visible because they are covered by the semi-cylindrical dome and thus are not easily accessible for cleaning. When the holes or spray nozzles become clogged, it is necessary to disassemble such systems in order to access the holes for cleaning.

It is an object of the present invention to provide a water distribution system which permits easy cleaning of the water distribution holes or nozzles in a water distribution pipe.

Another object of the present invention is to provide an easy cleaning water distribution system which is relatively simple in construction and economical to manufacture.

In accordance with an aspect of the present invention, a water distribution system is provided for use with evaporative cooling pads which have a top and first and second sides. The distribution system includes a water distribution pipe having a plurality of water discharge outlets in its periphery and means for mounting the pipe above the top of the pad. A water deflector extends along the top of the pad intermediate the first and second sides and includes a deflector plate. The openings in the pipe are located to direct water against the deflector plate, which has a predetermined configuration to direct water from the pipe onto the top of the pad. The pipe is mounted to permit it to move relative to the deflector plate to expose the discharge openings for cleaning. In one embodiment the pipe is mounted for rotation about its longitudinal axis over a limited range of motion and in another embodiment the pipe is mounted to pivot away from the deflector plate and the top of the evaporative cooling pad to expose the openings.

The water deflector may be mounted to sit on the top of the evaporative cooling pad or spaced slightly from it by an overhead support. Its deflector plate may be a flat inclined member or an arcuate member adjacent to the pipe.

The above, and other objects, features, and advantages of this invention, will be apparent in the following detailed description of illustrative embodiments thereof, which is to be read in connection with the accompanying drawings, wherein:

BRIEF DESCRIPTION OF DRAWINGS

FIG. 9 is an end view of the coupling member shown in FIG. 8;

FIG. 10 is a side elevational view of another embodiment of the invention using a mounting system that allows the water distribution pipe to pivot away from the deflector plate and evaporative cooling pad;

DETAILED DESCRIPTION

Figure 1:
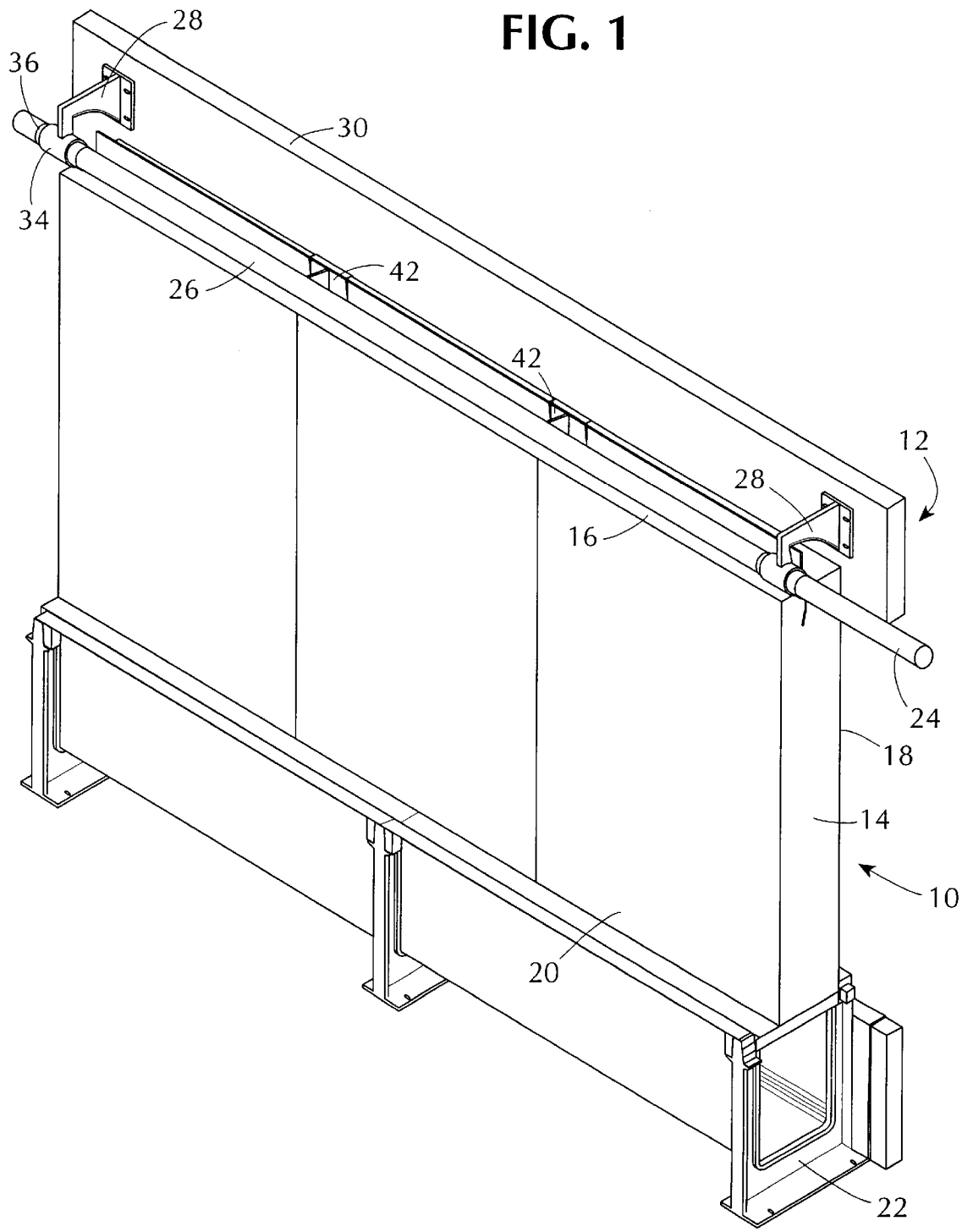
FIG. 1 is a perspective view of a water distribution system in accordance with one embodiment of the present invention.

Referring now to the drawings in detail, and initially to FIG. 1, an evaporative cooling system 10 is illustrated which includes a water distribution system 12 and a series of evaporative cooling pads 14. The pads 14 are of generally conventional construction and consist of layers of corrugated impregnated paper, plastic or other material which form a series of air and water distribution passageways through the body.

Water distribution system 12 distributes water to the top surface 16 of evaporative cooling pads 14 so that the water trickles down through the pads in the passageways formed by the corrugated sheets. Air is drawn through the front and rear sides 18, 20 of the pads by a fan system (not shown) and passes in cross current relationship to the water flowing downwardly in the passageways. As the air passes through the corrugations, it is cooled by evaporation of the water. The air is then used for agricultural evaporative cooling and/or humidification, evaporative cooling of industrial equipment, evaporative cooling of buildings, and the like. Not all of the water passing through the evaporative cooling pads evaporates. The unevaporated water is connected in a trough 22 and recirculated in a conventional manner. The water which evaporates is replenished by an outside supply.

In accordance with the present invention water is supplied to the evaporative cooling system through a water supply pipe 24 to a water distribution pipe 26. The pipe 26 is suspended above the top 16 of evaporative cooling pads 14 by support brackets 28. These brackets are mounted in any convenient manner to a fixed support structure 30 forming part of the building or enclosure in which the evaporative cooling system is mounted. Pipe 26 is supported in the support members or hooks 32 in brackets 28. More specifically, coupling members 34 are supported in the support members 32, as described in detail hereinafter. These coupling members receive adapters 36 secured to the ends of pipe 26, in any conveniently known manner. For example, pipe 26 and adapters 36 may be formed of PVC and secured together by an adhesive, or the like. The coupling members 34 and adapters 36 allow pipe 26 to be rotated longitudinally along its axis, relative to the couplings as described hereinafter.

Figure 2:
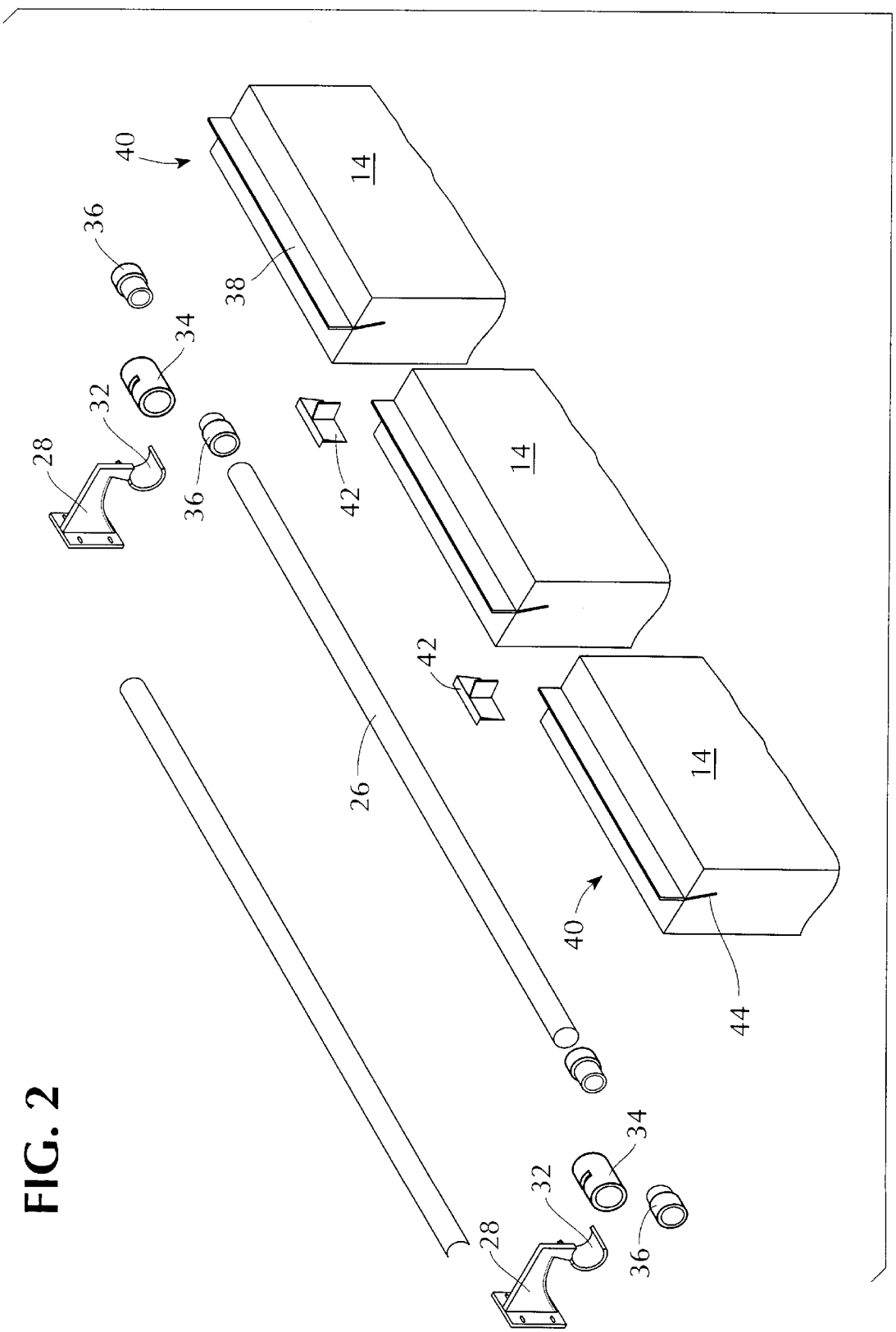
FIG. 2 is an exploded perspective view of the top portion of the system shown in FIG. 1.

Pipe 26 has a plurality of water discharge openings formed in its periphery along its length. These discharge openings (which may be provided with spray nozzles) are located such that water supplied to the pipe under pressure is discharged laterally of the pipe against the water deflector plate 38 of deflector 40. As seen in FIG. 2, there are three evaporative cooling pads 14 in the illustrated evaporative cooler. In a typical cooler there may be one pad or more than three pads as necessary for the particular application. In the multi-pad embodiment, each pad includes a deflector 40 and connector means 42 are provided to connect the deflector units together in the assembly, as seen in FIG. 1.

Figure 2A:
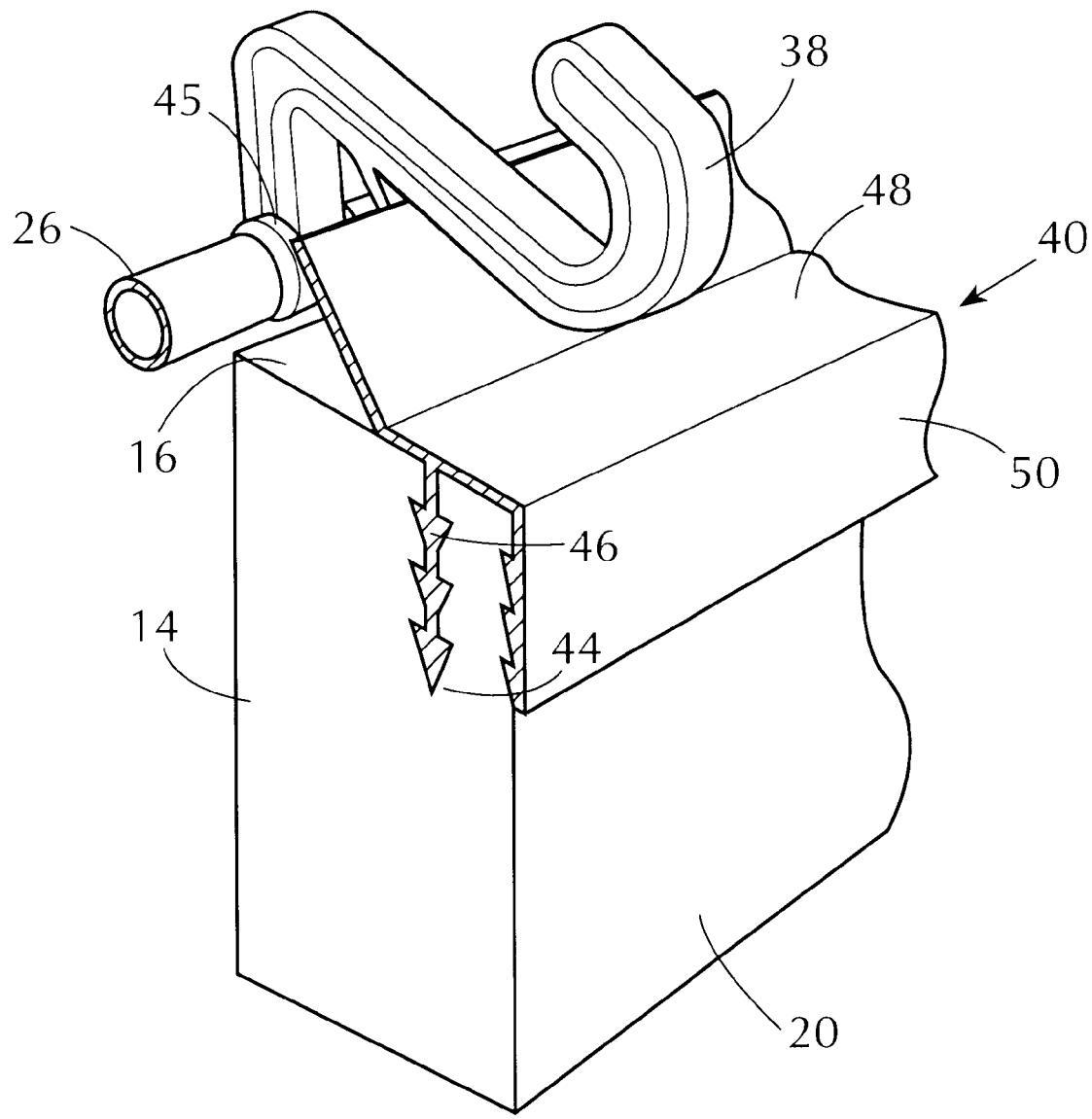
FIG. 2A is a perspective view of the water deflector mounting for the system shown in FIG. 1.

FIG. 2A illustrates a deflector 40 in greater detail. As seen therein, the deflector unit includes an integral relatively flat straight water deflector plate 38 which is inclined at an angle to the top surface 16 of the cooling pad 14 at a position intermediate to the front and rear sides of the pad. The deflector plate is positioned to incline towards pipe 26 so that water discharged from openings 45 in the pipe engages the deflector plate and is deflected to the top 16 of the evaporative cooling pad. The deflector unit 40 is mounted on the top of the evaporative cooling pad in any convenient manner. In the illustrative embodiment the top of the pad has a longitudinal channel 44 formed therein and the deflector unit includes a depending support plate which is barbed and received in channel 44 to hold the deflector unit in place. The deflector 40 also includes a support wall 48 and a bearing wall 50. The bearing wall extends downwardly along the rear surface 20 of the evaporative cooling pad and protects the top of the pad where it engages the structure 30. Such protective strips have previously been provided for evaporative cooling pads, but not in combination with a deflector plate arrangement as described in this application.

Figure 3:
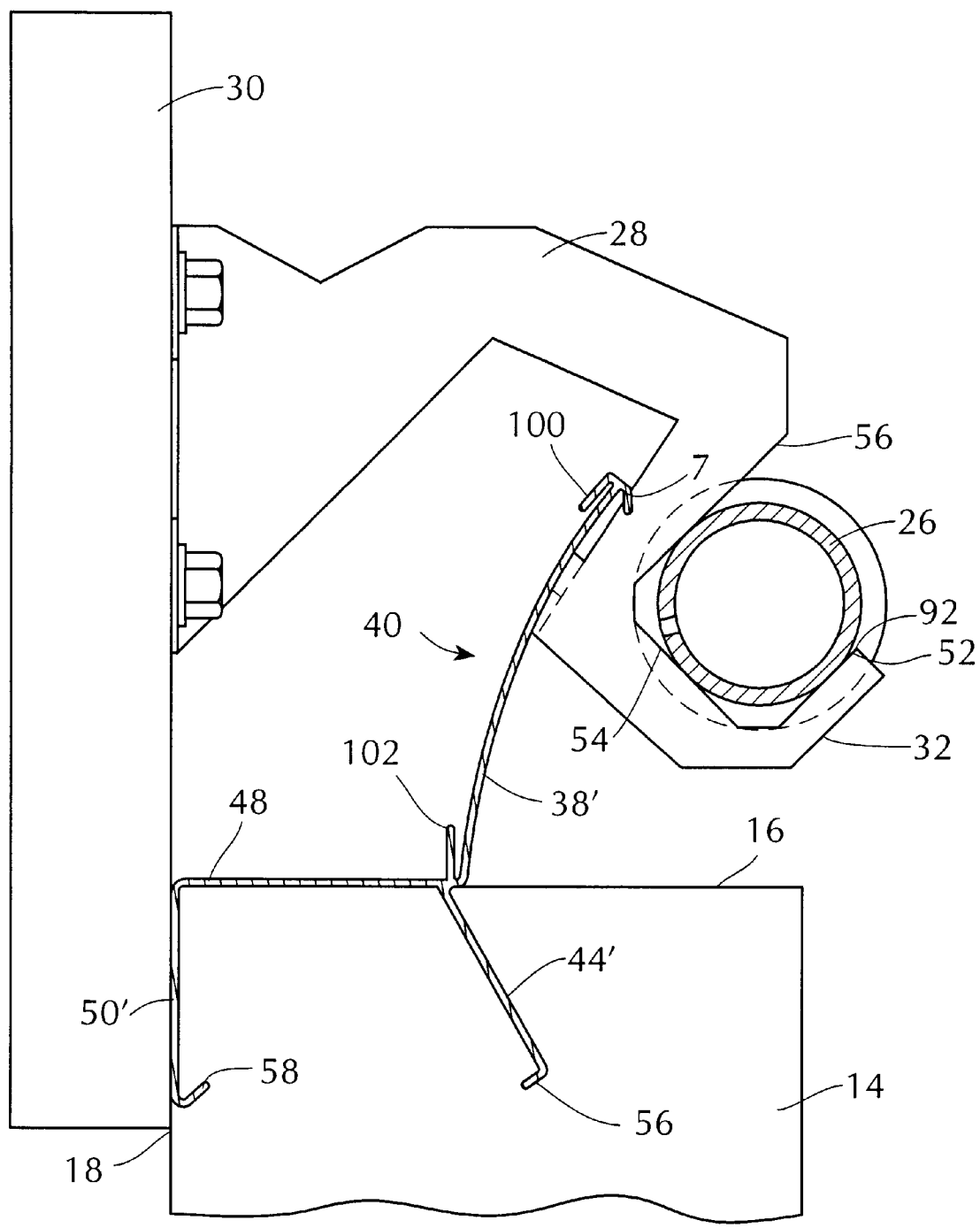
FIG. 3 is a side sectional view of the mounting arrangement for the water distribution system similar to that of FIG. 1, but showing a water deflector and pipe coupling member.

FIG. 3 illustrates a slightly modified embodiment of the invention. In this illustration, like parts are identified by similar reference numbers to those used in FIG. 2. In this embodiment, the support bracket 28 includes a hook 32 which has a plurality of straight support surfaces 52, 54 and 56 which cooperate with mating surfaces on the coupling member 34 (as described hereinafter) to prevent the coupling member from rotating during rotation of pipe 26. In addition, in this embodiment of the invention deflector unit 40 has a somewhat more complex construction. In particular, deflector plate 38' of deflector unit 40 has a somewhat arcuate shape extending from the support wall 48 upwardly towards water distribution pipe 26. Deflector unit 40 includes a penetrating support plate 44' which, in this case, has a smooth surface except for the bent end 56. This support plate is mounted in a complementary slot cut in the top 16 of evaporative cooling pad 14. In addition, back plate 50' of this deflector unit is received in a complementary slot 58 formed in the back wall 20 of the evaporative cooling pad to hold the deflector unit firmly in place.

Figure 4:
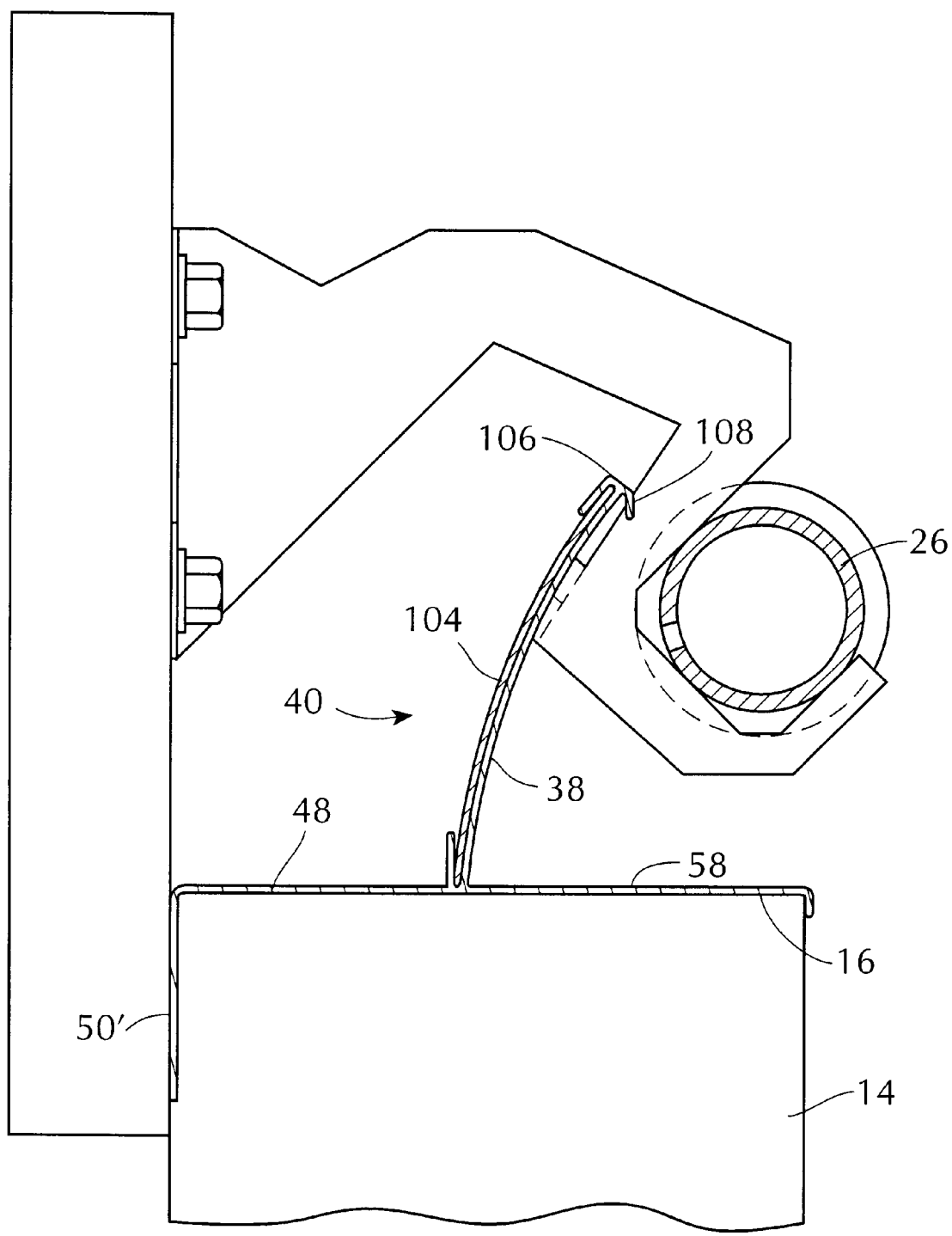
FIG. 4 is a side sectional view similar to FIG. 3 of another embodiment of the water deflector.

In the embodiment of the invention illustrated in FIG. 4, deflector unit 40 includes support wall 48 and the bearing plate 50' as described above. However, instead of the penetrating support plate 44' this deflector unit includes a forward support element 58 so that it is fully supported on the top 16 of cooling pad 14. In this case, member 58 will be slotted or have a plurality of openings formed therein to allow water sprayed from pipe 26 onto deflector plate 38 to pass into the top of the evaporative cooling pad.

Figure 5:
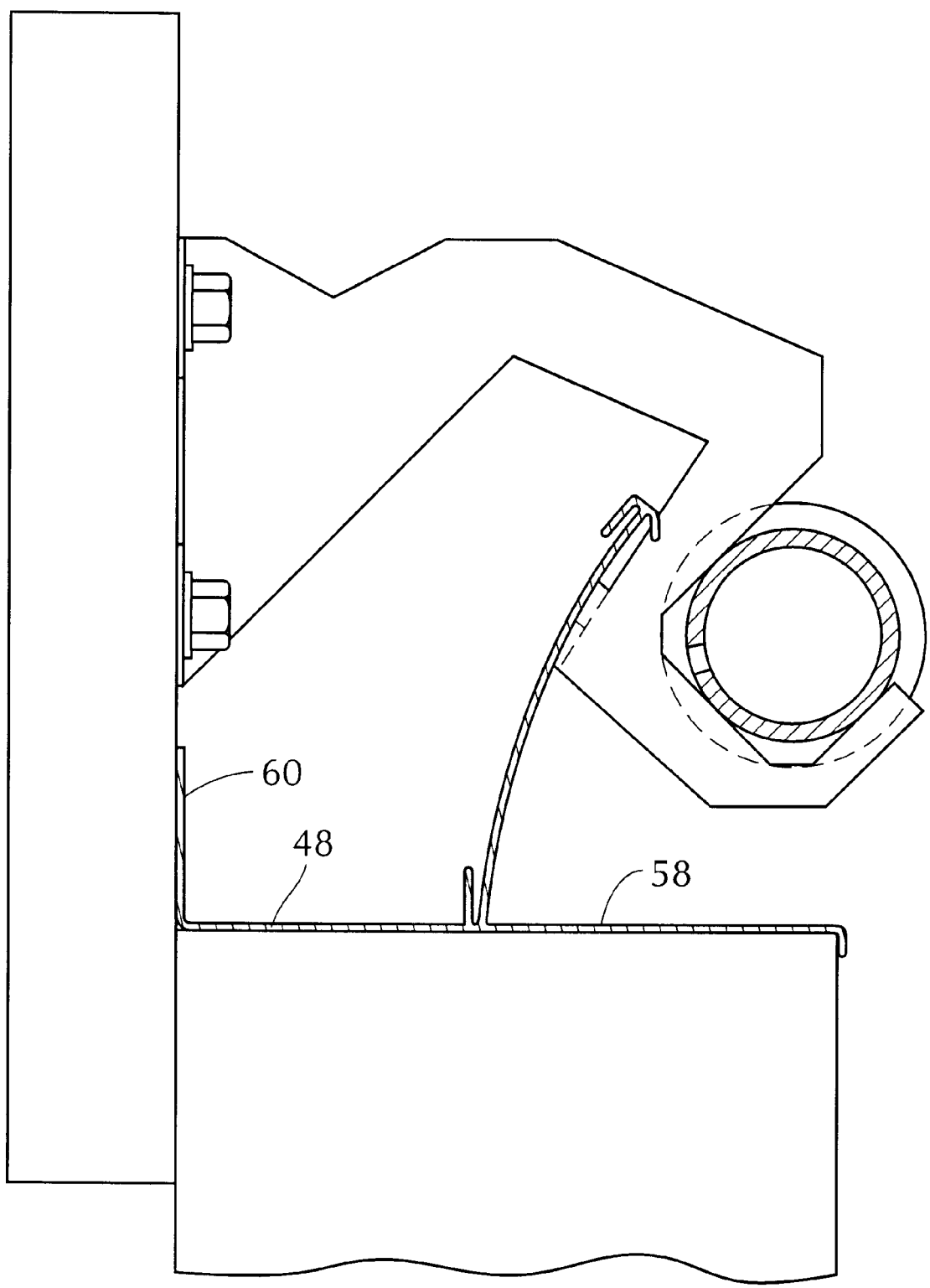
FIG. 5 is a side view similar to FIG. 3 showing yet another embodiment of the water deflector.

In the embodiment of the invention illustrated in FIG. 5, top plates 48 and 58 are similar to that shown in FIG. 4, but instead of bearing wall 50, a back-bearing plate 60 which extends upwardly is provided.

Figure 6:
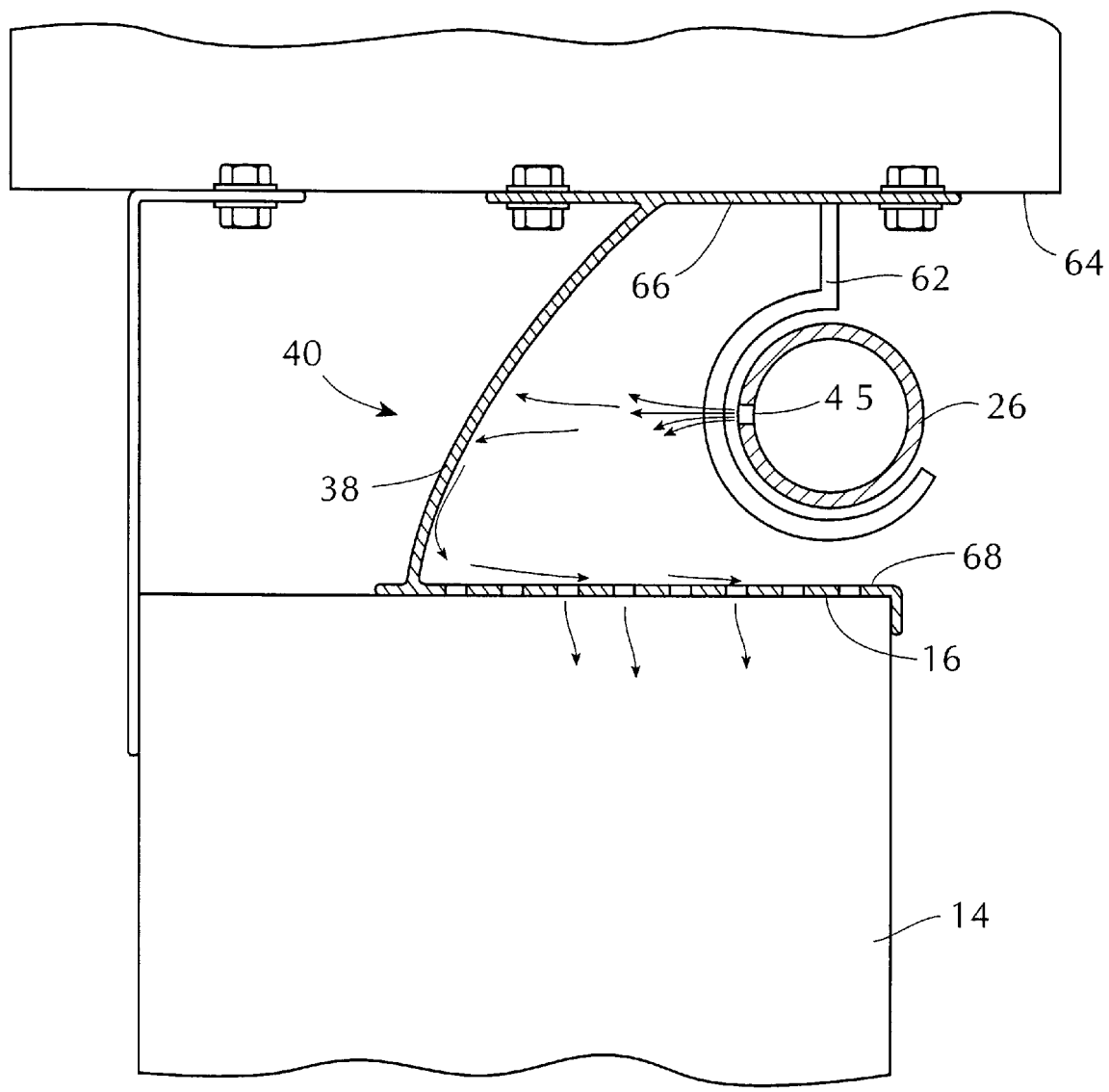
FIG. 6 is a side sectional view similar to FIG. 3 showing a still further embodiment of the water deflector.

In the embodiment of the invention illustrated in FIG. 6, water distribution pipe 26 is mounted from a support member 62 mounted on an overhead support 64 in any convenient manner. Support member 62 is integrally formed with a support plate 66 for the deflector unit 40. In this case, the deflector unit 40 includes an integral arcuate deflector plate 38 which extends downwardly from support plate 66 to a generally horizontal distribution plate 68. Distribution plate 68 will have a series of slots or openings therein which allow water sprayed from the apertures 45 in pipe 26 onto deflector plate 38 to pass into the top 16 of evaporative cooling pad 14.

Figure 7:
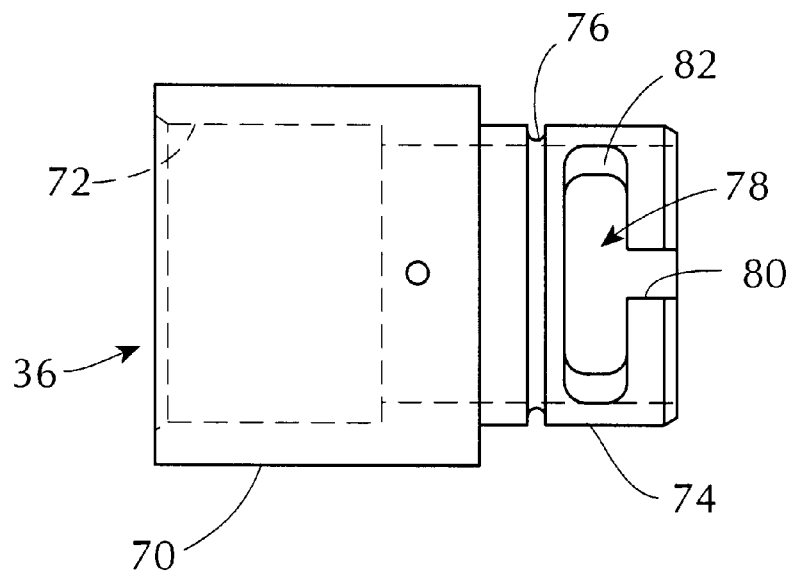
FIG. 7 is an elevational view of an adapter mounted on the end of the water distribution pipe which allows rotation of the pipe about its longitudinal axis.
Figure 8:
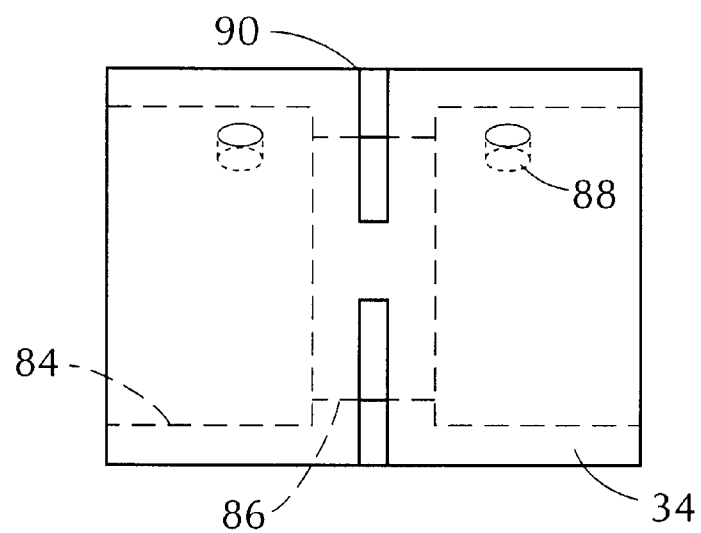
FIG. 8 is an elevational view of the coupling member used to couple two water distribution pipes together and allow rotation thereof.

FIGS. 7, 8 and 9 illustrate the coupling arrangement which allows pipe 26 to rotate in the supports 28 about its longitudinal axis. As seen in FIG. 7, the pipe adapters 36 (which are located and secured to each end of pipe 26) include a generally cylindrical collar 70 having an internal bore 72 in which the associated end of pipe 26 is secured by an adhesive, or the like and a smaller diameter extension 74 on one end thereof, with bore 72, in a slight narrower diameter, passing through that extension as well. Extension 74 includes an annular peripheral groove 76 in its outer surface for receiving an O-ring, or the like, for sealing purposes. In addition, collar 70 includes a T-shaped slot 78 having a stem 80 and a cross piece 82.

Extension 74 of adapter 36 is adapted to be received in pipe coupling member 34 (see FIGS. 8 and 9). Pipe coupling member 34 includes an internal bore 84 which extends entirely through the coupling but includes a smaller diameter intermediate section 86. The larger diameter ends of bore 84 are adapted to receive the extensions 74 of adjacent adapters 36. Coupling member 34 includes a pair of pins 88 located in each of the bores 84 (see FIG. 9). These pins are received in the stem 80 of the T-shaped slot 78 during insertion of the adapter extension into the coupling member. When the adapter extension is fully inserted, pins 88 lie within the cross piece 82 of the T-shape slot. As a result, the pipe may rotate relative to the coupling between the limits defined by the engagement of the pins 88 with the ends of the slot in cross piece 82. In one position, the water outlet openings of pipe 26 will face the deflector plate and in another position they will face forwardly towards the side 18 of the evaporative cooling pad where they are exposed for cleaning.

In the embodiment of FIGS. 1 and 2, the peripheral surface of coupling member 34 has a cylindrical slot which receives the cylindrical supports 32. In the embodiment of the invention illustrated in FIG. 3, the central portion 90 of coupling member 34 is shaped with three flat surfaces 92 that mate with the flat surfaces 52–56 of support 28, to hold coupling member 34 against rotation during rotation of pipe 26.

Referring again to FIG. 3, it is seen that deflector unit 40 includes a pair of flanges 100, 102 formed therein which define oppositely facing channels. These channels are adapted to receive the opposed edges of a connector plate 104 (see FIG. 4) to connect one deflector unit to an adjacent deflector unit. Connector plates 104 can be secured to the deflector units in any convenient manner, such as for example by bolts, screws, or the like. In addition, the upper end 106 of the deflector plate 38 includes a downwardly extending flange 108 on the side of the deflector plate 38 facing pipe 26. This flange serves to prevent water splashing against the deflector plate from flowing over the top of the deflector plate.

In the embodiment of the invention illustrated in FIG. 2, the deflector plates 38 are connected together simply by inverted U-shaped clips 42 as illustrated therein.

Referring now to FIG. 10, another embodiment of the invention is illustrated in which pipe 26 is mounted to rotate pivotally relative to deflector plate 38 and the top of the pad 14. In this embodiment, the system includes a mounting plate 122 having a pair of laterally spaced ears 124 (only one of which is seen in the side view of FIG. 10) to which a pivot pin 126 is secured in any convenient manner. A mounting bracket 128 is pivotably mounted on pin 126. The mounting bracket includes a first curved end 130 which partially surrounds pivot pin 126 and is received in space 132 between the wall bracket 122 and the pin 126. As illustrated in the drawing, the wall bracket is mounted to a support beam 30 which is part of the enclosure in which the system is mounted. The mounting plate is secured to the support beam in any convenient manner, for example by screws 134.

Support arm 128 includes a central section 136, which is generally horizontal in its normal position, and a depending leg 138. The free end 140 of leg 138 includes a cylindrical connection coupling 142 which is adapted to receive the ends of pipes 26. This connection is shown in greater detail in connection with the embodiment of FIG. 11. In this case, pipe 26 is preferably fixed in coupling 142; however, the coupling could be formed as described above with respect to the embodiment of FIGS. 1–3 to allow the pipe to rotate on its axis, if desired.

Support arm 128 includes an additional depending leg 144 which is located to engage deflector plate 38, as seen in FIG. 10, to limit pivotal movement of the arm downwardly towards pad 14 and to thereby define a fixed position operating for the arm. In that position, water is sprayed from the openings 45 in pipe 26 onto the facing surface of deflector plate 38. In the event the openings become clogged, it is a simple matter to pivot bracket 128 in a clockwise direction, as seen in FIG. 10, in order to move the pipe way from the deflector plate and the top of the pad 14 so that openings 45 are exposed for cleaning.

Figure 11:
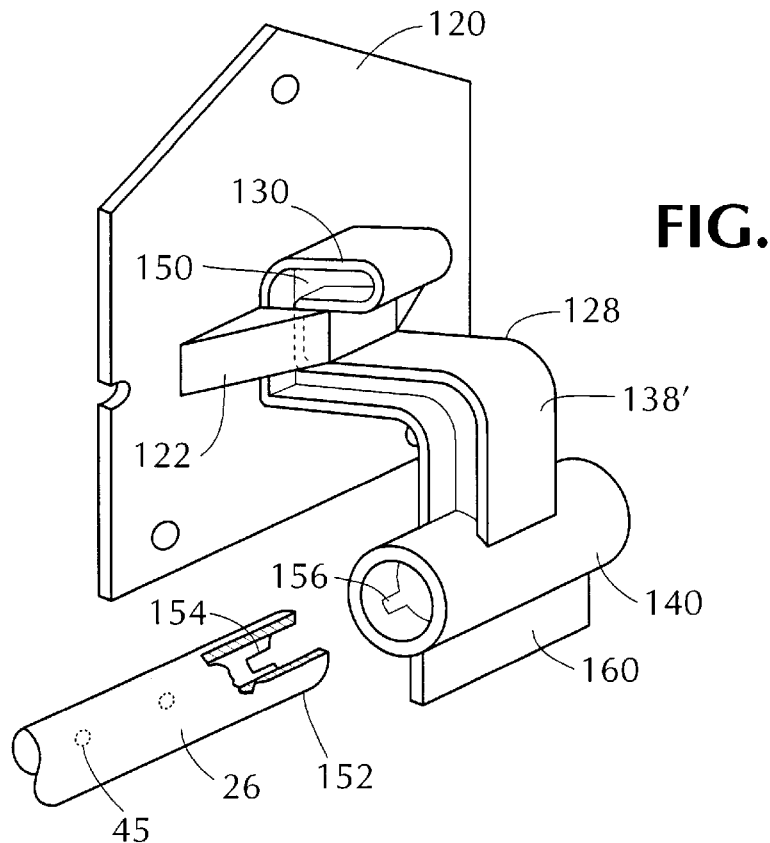
FIG. 11 is a perspective view of the embodiment of FIG. 10, illustrating the coupling of the pipe of the water distribution pipe to the support.
Figure 12:
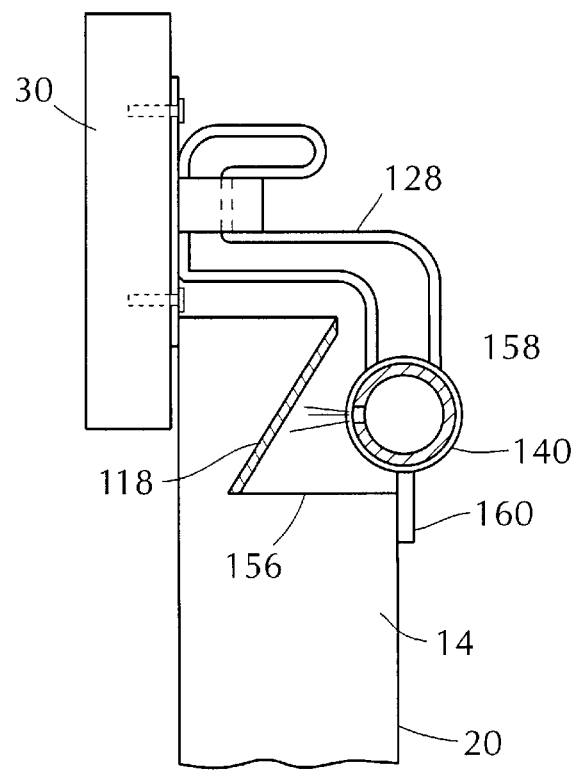
FIG. 12 is an end view of yet another embodiment of the invention.

Another embodiment of the invention is illustrated in FIGS. 11 and 12. In this embodiment, the wall bracket 122 includes an integral loop 150 which receives the curved end 130 of support arm 128. The support arm 128 includes a generally straight downwardly extending end 138' containing the cylindrical connection coupling 142. As seen in FIG. 11, coupling 142 is a cylindrical member adapted to receive the end 152 of pipe 26. The end of the pipe is slotted at 154 to receive a locking protrusion 156 on the interior of coupling 142 to locate the pipe in position so that its openings 45 are directed to the adjacent deflector plate. As mentioned above, this coupling can be constructed similarly to the coupling arrangements previously described to allow the pipe to rotate, if desired.

This mounting system can be used with the deflector units previously described. Alternatively, it can be used with a deflector plate arrangement as shown in FIG. 12. In this case, pad 14 has an acute cut-out 156 formed therein with a flat deflector plate 158 secured in any convenient manner to the inclined surface of the cut-out. In addition, coupling 142 has a plate 160 depending therefrom, which in this embodiment engages the front face 18 of evaporative cooling pad 14 to limit the clockwise pivotal movement (as viewed in FIG. 12) of the coupling and bracket 128.

Figure 13:
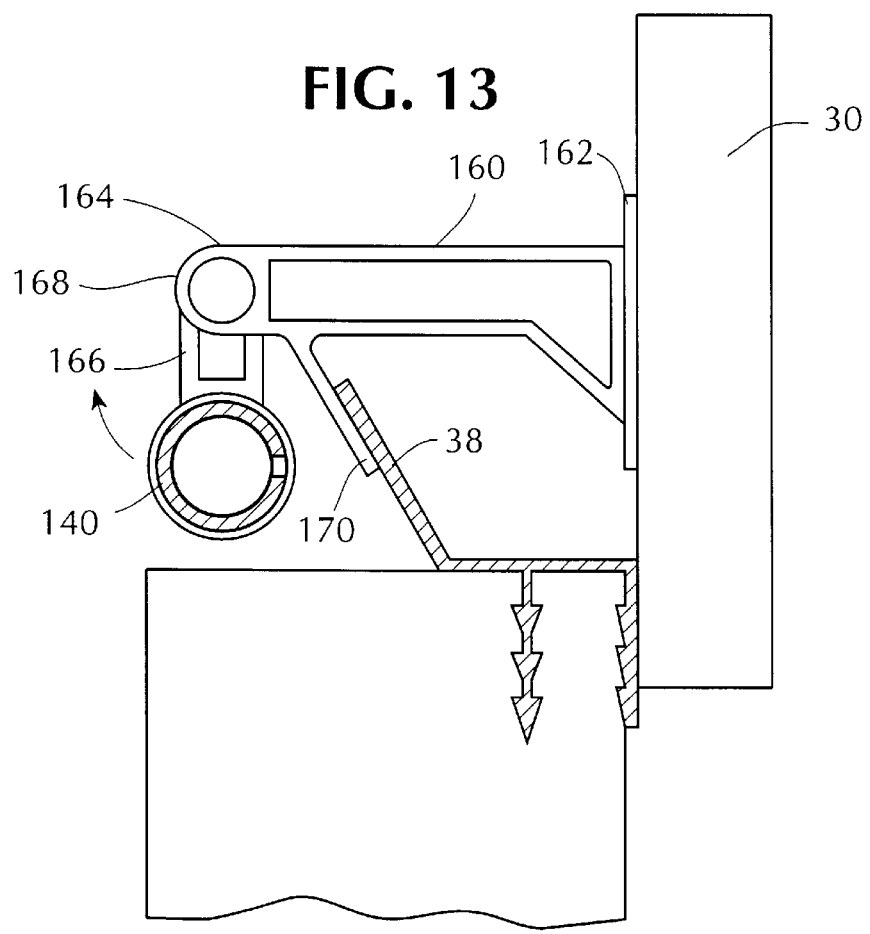
FIG. 13 is a side view of a still further embodiment of the present invention.
Figure 14:
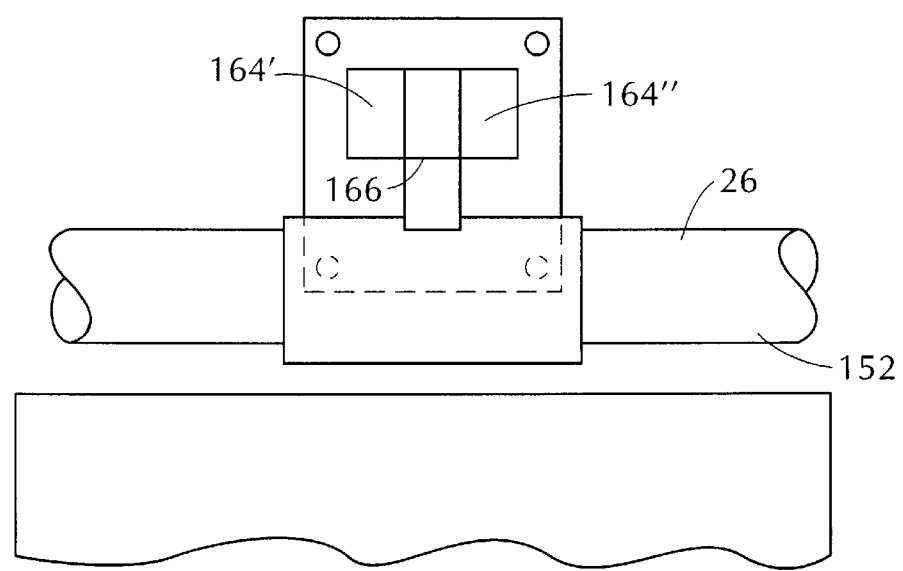
FIG. 14 is a front view of the device shown in FIG. 13 illustrating the pivotal mounting arrangement.

Another embodiment of the invention is illustrated in FIGS. 13 and 14. In this embodiment, a support arm 160 is integrally formed with a mounting bracket 162 adapted to be secured to a support beam 30 in any convenient manner. Support arm 160 has a free end 164 having two halves, 164' and 164" forming a yolk which receives a secondary support arm 166 therebetween. A pivot pin 168 connects the secondary support arm 166 to the yolk 164 for pivotal movement. Secondary support arm 166 has a cylindrical connection coupling 142 integrally formed therewith. This coupling is constructed similarly to the coupling 142 of the embodiment of FIG. 11 or to the couplings as described with respect to the embodiment of FIGS. 1–3. The coupling receives at its ends the ends 152 of pipe 26. In addition, the support arm 160 has a depending plate 170 on its lower surface positioned to engage deflector plate 38 to hold the pad in its vertical position against support beam 30. Although illustrative embodiments of the present invention have been described herein with reference to the accompanying drawings, it is to be understood that this invention is not limited to those precise embodiments, but that various changes and modifications may be effected therein without departing from the scope or spirit of this invention.

What is claimed is:

1. A water distribution system for use with an evaporative cooling pad having a top and first and second sides comprising a water distribution pipe having at least one water discharge outlet in its periphery, means for mounting said pipe above the top of the pad, and a water deflector unit extending along the top of said pad intermediate said first and second sides and including a deflector plate having a predetermined configuration, said at least one opening in the pipe being located to direct water against said deflector plate to direct water from the pipe onto the top of the pad; said deflector unit being mounted adjacent the top of the evaporative cooling pad; and said deflector plate being an arcuate member extending upwardly from the top of the evaporative cooling pad towards said pipe; said deflector plate having a top edge including a secondary deflector portion extending downwardly therefrom on the side of the deflector plate facing the pipe for preventing water impacting on the deflector plate from overflowing the top edge thereof.

2. A water distribution system as defined in claim 1 wherein said deflector unit includes a support plate penetrating said top of the evaporative cooling pad.

3. A water distribution system as defined in claim 1 wherein said deflector unit includes a bearing plate extending along a portion of one of said first and second side walls adjacent the top of the pad.

4. A water distribution system as defined in claim 1 wherein said deflector plate is flat and extends at an acute angle to the top of the evaporative cooling pad at an incline towards said pipe.

5. A water distribution system as defined in claim 1 including a plurality of longitudinally aligned deflector units and means for connecting said units together.

6. A water distribution system for use with an evaporative cooling pad having a top and first and second sides comprising a water distribution pipe having at least one water discharge outlet in its periphery, means for mounting said pipe above the top of the pad, a plurality of longitudinally-aligned water deflector units and means for connecting said units together; said water deflector units extending along the top of said pad intermediate said first and second sides and each of said water deflector units including a deflector plate having a predetermined configuration, said at least one discharge outlet in the pipe being located to direct water against a deflector plate to direct water from the pipe onto the top of the pad; each said deflector unit being mounted adjacent the top of the evaporative cooling pad; and each said deflector plate being an arcuate member extending upwardly from the top of the evaporative cooling pad towards said pipe; and wherein each said deflector plate includes opposed channel members on the side thereof opposite the side facing the pipe and said connecting means includes a connector plate slidably received in said channels.

7. A water distribution system as defined in claim 6 wherein said deflector unit includes a support plate penetrating said top of the evaporative cooling pad.

8. A water distribution system as defined in claim 6 wherein said deflector unit includes a bearing plate extending along a portion of one of said first and second side walls adjacent the top of the pad.

9. A water distribution system as defined in claim 7 wherein said deflector unit includes a bearing plate extending along a portion of one of said first and second side walls adjacent the top of the pad.

10. A water distribution system as defined in claim 6 wherein said deflector plate has a top edge including a secondary deflector portion extending downwardly therefrom on the side of the deflector plate facing the pipe for preventing water impacting on the deflector plate from flowing over the top edge thereof.

11. A water distribution system for use with an evaporative cooling pad having a top and first and second sides comprising a water distribution pipe having at least one water discharge outlet in its periphery, means for mounting said pipe above the top of the pad, and a water deflector unit extending along the top of said pad intermediate said first and second sides and including a deflector plate having a predetermined configuration, said at least one opening in the pipe being located to direct water against said deflector plate to direct water from the pipe onto the top of the pad; said deflector unit being mounted adjacent the top of the evaporative cooling pad; and wherein said means for mounting said pipe comprises means for permitting said pipe to move relative to the deflector plate to expose said at least one water discharge outlet for cleaning.

12. A water distribution system as defined in claim 11 wherein said deflector plate is an arcuate member extending upwardly fro m the top of the evaporative cooling pad toward said pipe.

13. A water distribution system as defined in claim 11 wherein said means for permitting movement includes rotary coupling means for permitting said pipe to rotate about its longitudinal axis.

14. A water distribution system as defined in claim 13 wherein said rotary coupling means includes means for limiting rotation of the pipe on its axis between first and second positions.

15. A water distribution system as defined in claim 13 wherein said mounting means comprises at least one bracket adapted to be mounted to a fixed surface adjacent said pad and including a support member for receiving and supporting said coupling means.

16. A water distribution system as defined in claim 15 wherein said support member and the exterior surface of the coupling member include cooperatively shaped surfaces for preventing rotation of the coupling member relative to the support member during rotation of the pipe relative to the coupling member and deflector plate.

17. A water distribution system as defined in claim 11 wherein said deflector unit is supported along the top of said pad on the mounting means for the pipe.

18. A water distribution system as defined in claim 11 wherein said means for permitting the pipe to move relative to the deflector plate includes means for pivotally mounting the pipe on the mounting means allowing the pipe to pivot away from the deflector plate and the top of the pad.

19. A water distribution system as defined in claim 18 including means on said mounting means for engaging the deflector plate to prevent movement of the plate and pad.

20. A water distribution system as defined in claim 18 wherein said mounting means includes a support bracket adapted to be mounted on a fixed surface adjacent the evaporative cooling pad, a support arm connected to the pipe and cooperating means on the support arm and bracket for allowing pivotal movement of the support arm relative to the bracket.

21. A water distribution system as defined in claim 11 wherein said deflector unit includes a support plate penetrating said top of the evaporative cooling pad.

22. A water distribution system as defined in claim 11 wherein said deflector unit includes a bearing plate extending along a portion of one of said first and second side walls adjacent the top of the pad.

23. A water distribution system as defined in claim 11 wherein said deflector plate is flat and extends at an acute angle to the top of the evaporative cooling pad at an incline towards said pipe.

24. A water distribution system as defined in claim 11 wherein said deflector plate is an arcuate member extending upwardly from the top of the evaporative cooling pad toward said pipe.

25. A water distribution system as defined in claim 11 wherein said deflector plate has a top edge including a secondary deflector portion extending downwardly therefrom on the side of the deflector plate facing the pipe for preventing water impacting on the deflector plate from flowing over the top edge thereof.

26. A water distribution system as defined in claim 11 including a plurality of longitudinally aligned deflector units and means for connecting said units together.

27. A water distribution system for an evaporative cooling pad having a top and first and second sides comprising a water distribution pipe having a plurality of water discharge outlets in its periphery, means for mounting said pipe above the top of the pad, and a water deflector unit extending along the top of said pad intermediate said first and second sides and including a deflector plate having a predetermined configuration, said openings in the pipe being located to direct water onto the top of the pad;

and said means for mounting said pipe comprising means for permitting said pipe to move relative to the deflector plate to expose said discharge outlets for cleaning.

28. A water distribution system as defined in claim 27 wherein said means for permitting movement includes rotary coupling means for permitting said pipe to rotate about its longitudinal axis.

29. A water distribution system as defined in claim 28 wherein said rotary coupling means includes means for limiting rotation of the pipe on its axis between first and second positions.

30. A water distribution system as defined in claim 29 wherein said mounting means comprises at least one bracket adapted to be mounted to a fixed surface adjacent said pad and including a support member for receiving and supporting said coupling means.

31. A water distribution system as defined in claim 30 wherein said support member and the exterior surface of the coupling member include cooperatively shaped surfaces for preventing rotation of the coupling member relative to the support member during rotation of the pipe relative to the coupling member and deflector plate.

32. A water distribution system as defined in claim 30 wherein said deflector unit is supported along the top of said pad on the mounting means for the pipe.

33. A water distribution system as defined in claim 30 wherein said deflector unit is mounted adjacent the top of the evaporation cooling pad and includes a deflector plate for deflecting water from the pipe to the top of the pad.

34. A water distribution system as defined in claim 33 wherein said deflector plate includes a support plate penetrating said top of the evaporative cooling pad.

35. A water distribution system as defined in claim 34 wherein said deflector plate includes a bearing plate extending along a portion of one of said first and second side walls adjacent the top of the pad.

36. A water distribution system as defined in claim 35 wherein said deflector plate is flat and extends at an acute angle to the top of the evaporative cooling pad at an incline towards said pipe.

37. A water distribution system for an evaporative cooling pad having a top and first and second sides comprising a water distribution pipe having a plurality of water discharge outlets in its periphery, means for mounting said pipe above the top of the pad, and a deflector unit extending along the top of said pad intermediate said first and second sides, said deflector unit including a deflector plate having a predetermined configuration, and said openings in the pipe being located to direct water against said deflector plate onto the top of the pad;
   said means for mounting said pipe comprising means for permitting said pipe to move relative to the deflector plate to expose said water discharge outlets for cleaning;
   said means for permitting the pipe to move relative to the deflector plate including means for pivotally mounting the pipe in the mounting means allowing the pipe to pivot away from the deflector plate and the top of the pad.

38. A water distribution system as defined in claim 37 including means on said mounting means for engaging the deflector plate to prevent movement of the plate and pad.

39. A water distribution system as defined in claim 37 wherein said mounting means includes a support bracket adopted to be mounted in a fixed surface adjacent the evaporative cooling pad, a support arm connected to the pipe and cooperating means on the support arm and bracket for allowing pivotal movement of the support arm relative to the bracket.

40. A water distribution system as defined in claim 38 wherein said deflector unit is mounted adjacent the top of the evaporative cooling pad and includes a deflector plate for deflecting water from the pipe to the top of the pad.

41. A water distribution system as defined in claim 40 wherein said deflector unit includes a support plate penetrating said top of the evaporative cooling pad.

42. A water distribution system as defined in claim 41 wherein said deflector unit includes a bearing plate extending along a portion of one of said first and second side walls adjacent the top of the pad.

43. A water distribution system as defined in claim 42 wherein said deflector plate is an arcuate member extending upwardly from the top of the evaporative cooling pad toward said pipe.

44. A water distribution system as defined in claim 43 wherein said deflector plate has a top edge including a secondary deflector portion extending downwardly therefrom on the side of the deflector plate facing the pipe for preventing water impacting on the deflector plate from flowing over the top edge thereof.

45. A water distribution system as defined in claim 44 including a plurality of longitudinally aligned deflector units and means for connecting said units together.

46. A water distribution system as defined in claim 45 wherein said deflector plate includes opposed channel members on the side thereof opposite the side facing the pipe and said connecting means includes a connector plate slidably received in said channels.

47. A water distribution system for an evaporative cooling pad having a top and first and second sides comprising a water distribution pipe having a plurality of water discharge outlets in its periphery, means for mounting said pipe above the top of the pad, and a water deflector unit extending along the top of said pad intermediate said first and second sides, said deflector unit including a deflector plate having a predetermined configuration, and said openings in the pipe being located to direct water against said deflector plate onto the top of the pad;
   said deflector plate being an arcuate member extending upwardly from the top of the evaporative cooling pad toward said pipe; and
   said means for mounting said pipe includes means for pivotally mounting the pipe in the mounting means to allow the pipe to pivot away from the deflector plate and the top of the pad.

48. A water distribution system as defined in claim 47 including means on said mounting means for engaging the deflector plate to prevent movement of the plate and pad.

49. A water distribution system as defined in claim 47 wherein said mounting means includes a support bracket adopted to be mounted on a fixed surface adjacent the evaporative cooling pad, a support arm connected to the pipe and cooperating means on the support arm and bracket for allowing pivotal movement of the support arm relative to the bracket.

50. A water distribution system as defined in claim 49 wherein said deflector unit includes a support plate penetrating said top of the evaporative cooling pad.

51. A water distribution system as defined in claim 50 wherein said deflector unit includes a bearing plate extending along a portion of one of said first and second side walls adjacent the top of the pad.

52. A water distribution system as defined in claim 51 wherein said deflector plate has a top edge including a secondary deflector portion extending downwardly therefrom on the side of the deflector plate facing the pipe for preventing water impacting on the deflector plate from flowing over the top edge thereof.

53. A water distribution system as defined in claim 52 including a plurality of longitudinally aligned deflector units and means for connecting said units together.

54. A water distribution system as defined in claim 53 wherein said deflector plate includes opposed channel members on the side thereof opposite the side facing the pipe and said connecting means includes a connector plate slidably received in said channels.

* * * * *